3,096,350
6,16α-DIMETHYL-Δ$^{1,4,6}$-PREGNATRIENE-17α-OL-3,20-DIONE AND ESTERS THEREOF
Jose Iriarte, Carl Djerassi, and Howard J. Ringold, all of Mexico City, Mexico, assignors, by mesne assignments, to Syntex Corporation, a corporation of Panama
No Drawing. Filed Jan. 19, 1960, Ser. No. 3,278
Claims priority, application Mexico Jan. 28, 1959
4 Claims. (Cl. 260—397.4)

The present invention relates to novel cyclopentanophenanthrene compounds and process of preparing same.

More particularly the invention relates to the novel 6,16α-dimethyl-17α-hydroxyprogesterone, as well as to the 1-dehydro, 6-dehydro and bis-1,6-dehydro-compounds and to esters of the 6-dehydro and 1,6-bis-dehydro, 6,16α-dimethyl-17α-hydroxy progesterones.

The new compounds can be represented by the following formulas:

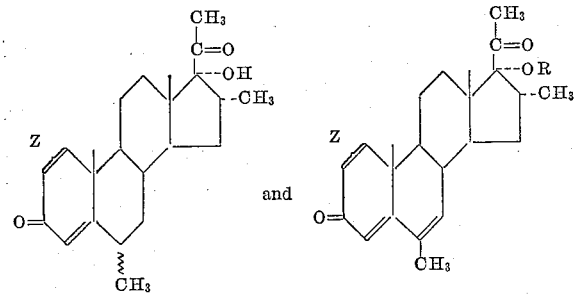

In the above formula, Z indicates a double bond between C-1 and C-2 or a saturated linkage and R represents the acyl residue of a hydrocarbon carboxylic acid having less than 12 carbons atoms, saturated or unsaturated, straight chain or branched chain, aliphatic, cyclic, cylo-aliphatic, aromatic, and which may be substituted with halogen or other groups. Typical examples of such ester groups are the acetate, propionate, butyrate, hemisuccinate, enanthate, caproate, benzoate, trimethylacetate, phenoxyacetate, phenylpropionate and β-chloropropionate.

The wavy line at C-6 designates the α and β configurations.

The novel compounds are valuable intermediates for the synthesis of 6,16α-dimethyl-cortical hormones since they can be acetoxylated at C-21 by iodination and subsequent acetolysis, and an oxygen function at C-11 may be introduced by known biochemical methods. The novel esters of 6,16α-dimethyl-6-dehydro-17α-hydroxyprogesterone and of 6,16α-dimethyl-1,6-bis-dehydro-17α-hydroxyprogesterone are potent progestational agents.

The following equation illustrates in part a process for the preparation of the novel compounds of the present invention:

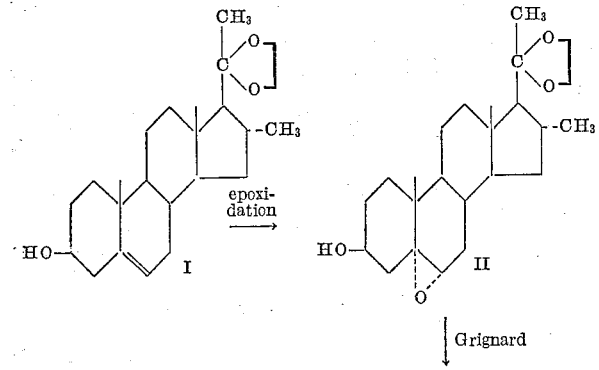

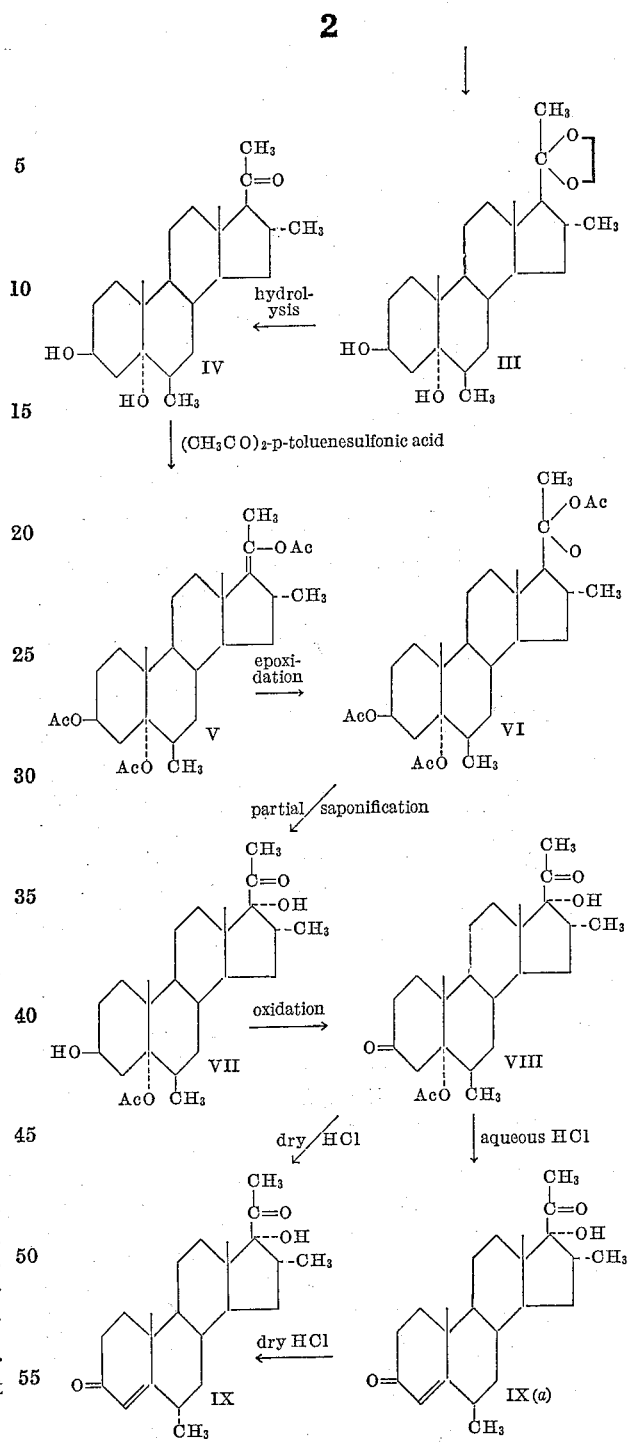

In the above equation Ac represents the acyl residue of acetic acid.

In practicing the process outlined above, the preferred starting material is 16α-methyl-Δ$^5$-pregnene-3β-ol-20-one (Marker et al., J.A.C.S. 64, 1280 (1942)). The ethylene ketal of 16α-methyl-Δ$^5$-pregnene-3β-ol-20-one is subjected to epoxidation using conventional reagents such as an aromatic peracid, as for example monoperphthalic or perbenzoic acid. The 5α,6α-epoxy compound is treated with a Grignard reagent such as methyl-magnesium-bromide or -iodide in an inert solvent, for example benzene, ether, tetrahydrofuran or a mixture of ethers, under reflux conditions thus producing 6β,16α-dimethyl-20-ethylenedioxy-pregnane-3β,5α-diol. After removal of the ketal group by hydrolysis in the usual manner as with p-toluenesulfonic acid in acetone or dilute hydrochloric acid in methanol, the 17α-hydroxy group was introduced by formation of the enol acetate at C-20 and acetylation at C-3 and C-5 followed by epoxidation of the double bond C-17,20 to produce the 17,20-epoxy derivative. The latter compound upon treatment with dilute methanolic sodium hydroxide is transformed into 6β,16α-dimethyl-5α-acetoxy-pregnane-3β,17α-diol-20-one which upon oxidation with an oxidizing agent such as chromic acid in dilute sulfuric acid or chromic acid-pyridine complex yields the corresponding 3-keto compound. By treatment of the aforementioned compound with strong acid such as anhydrous hydrogen chloride in glacial acetic acid, or sulfuric acid, the elements of acetic acid are split off forming the C-4,5 double bond and the steric configuration in C-6 is inverted to produce the 6α,16α-dimethyl-17α-hydroxy-progesterone whereas treatment with aqueous concentrated hydrochloric acid in glacial acetic acid for a short reaction time results in elimination of acetic acid without significant inversion at C-6 yielding 6β,16α-dimethyl-17α-hydroxy progesterone.

For the introduction of an additional double bond between C-1 and C-2, the compounds are treated by known methods with selenium dioxide or by microbiological methods as for example, incubation with Corynebacerium Simplex ATCC 6946.

The 6-dehydro derivatives of either the 6,16α-dimethyl-17α-hydroxy progesterones or the 6,16α-dimethyl-17α-hydroxy-1-dehydroprogesterones are obtained by refluxing any of the latter compounds, with chloranil conveniently in admixture with an ester and an acid such as ethyl acetate and acetic acid. The 1,4,6-trienes can be obtained either by reacting 6,16α-dimethyl-17α-hydroxy progesterones with chloranil in amyl alcohol or by treatment of the 4,6-dienes with selenium dioxide.

The formation of the 1-dehydro, 6-dehydro and the 1,6-bis-dehydro compounds can be carried out either before or after esterification of the 17α-hydroxy group. Conventional esterification with an anhydride derived from a hydrocarbon carboxylic acid of less than 12 carbon atoms, including those previously set forth, gave the corresponding ester.

The following specific examples serve to illustrate but are not intended to limit the present invention.

*Example I*

A mixture of 10 g. of 16α-methyl-Δ⁵-pregnen 3β-ol-20-one, 400 cc. of benzene, 80 cc. of ethylene glycol previously distilled over potassium hydroxide and 1.0 g. of p-toluenesulfonic acid was refluxed for 18 hours with the use of an adapter for the continuous removal of the water formed during the reaction. The mixture was neutralized with aqueous saturated sodium bicarbonate solution, washed with water to neutral, dried over anhydrous sodium sulfate and the solvent was evaporated under reduced pressure. There was thus obtained 16α-methyl-20-ethylenedioxy-Δ⁵-pregnen-3β-ol, which was used for the next stage without further purification. By recrystallization of a small amount from ether there was obtained the pure compound, M.P. 171–172° C. $[\alpha]_D$ —51° (chloroform).

The above ketal was dissolved in 200 cc. of chloroform, mixed with 1.5 molar equivalents of monoperthalic acid in ether solution and kept standing at room temperature for 20 hours. After diluting with water the organic layer was separated, washed with water, 5% aqueous sodium bicarbonate solution and again with water to neutral, dried over anhydrous sodium sulfate, filtered and evaporated to dryness under reduced pressure. The residue was chromatographed on neutral alumina, thus yielding 16α-methyl-20-ethylenedioxy-5α,6α-oxido-pregnan-3β-ol, M.P. 156–158° C. $[\alpha]_D$—61.5° (chloroform).

A mixture of 5 g. of the above compound, 100 cc. of anhydrous benzene free of thiophene and 25 cc. of a 3 N solution of methyl magnesium bromide in ether was refluxed for 6 hours, cooled and poured into 1 lt. of ice cold 5% ammonium chloride solution. The benzene layer was separated, washed with aqueous saturated sodium chloride solution, dried over anhydrous sodium sulfate and evaporated to dryness. Chromatography of the residue on neutral alumina furnished 6β,16α-dimethyl-20-ethylenedioxy-pregnene-3β,5α-diol, M.P. 180–183° C. $[\alpha]_D$—21° (chloroform).

A mixture of 3 g. of the above compound, 150 cc. of acetone, 3 cc. of water and 300 mg. of p-toluenesulfonic acid was kept at room temperature for 6 hours, diluted with water and the precipitate was collected by filtration, washed with water and dried in vacuum. There was thus obtained 6β,16α-dimethyl-pregnane-3β,5α-diol-20-one, M.P. 212–213° C. $[\alpha]_D$+29° (chloroform).

From a mixture of 3 g. of the above compound, 1.35 g. of p-toluenesulfonic acid and 150 cc. of acetic anhydride about 120 cc. of solution was distilled in a period of 5 hours. The residue was poured into ice water, the product was extracted with ether, washed to neutral, dried over anhydrous sodium sulfate and evaporated to dryness. The residue consisted of 6β,16α-dimethyl-Δ$^{17(20)}$-pregnene-3β,5α,20-triol-triacetate, which was used for the next stage without further purification.

The above crude triacetate was treated with 120 cc. of a benzene solution of perbenzoic acid containing 1.2 molar equivalents of the reagent. The mixture was kept at room temperature in the dark for 20 hours and then diluted with water; the organic layer was separated, washed to neutral, dried over anhydrous sodium sulfate and the solvent was evaporated. The residue consisted of the crude, 6β,16α-dimethyl-17,20-oxido-pregnane,3β,5α,20-triol triacetate.

The above oxido compound was treated with 400 cc. of a 0.25 N solution of sodium hydroxide in methanol and kept at room temperature for 40 minutes, neutralized with acetic acid and concentrated to a small volume; after diluting with water the product was isolated by extraction with ethyl acetate. Chromatography of the extract residue afforded 6β,16α-dimethyl-pregnene-3β,5α,17α-triol-20-one 5-acetate.

A stirred solution of 2.4 g. of the above compound in 90 cc. of acetone was rapidly treated at 0° C. and under an atmosphere of nitrogen with an 8 N solution of chromic acid in dilute sulfuric acid until the brown-red color persisted in the mixture; after stirring for 5 minutes further, the mixture was diluted with ice water, the precipitate formed was collected, washed with water to neutral, dried and recrystallized from acetone-hexane, thus furnishing 6β,16α-dimethyl-pregnane-5α,17α-diol-3,20-dione 5-acetate.

A slow stream of dry hydrogen chloride was introduced for 4 hours into a solution of 2 g. of the above compound in 200 cc. of glacial acetic acid, maintaining the temperature below 18° C. The mixture was poured into ice water, the precipitate was collected by filtration, washed with water, dried and recrystallized from acetone-hexane, thus producing 6α,16α-dimethyl-17α-hydroxyprogesterone.

A mixture of 1 g. of the above compound, 50 cc. of t-butanol, 300 mg. of selenium dioxide and a few drops of pyridine was refluxed under an atmosphere of nitrogen for 48 hours, filtered through celite and the solvent was evaporated under reduced pressure; the residue was refluxed with decolorizing charcoal in acetone for 1 hour, filtered and the acetone was evaporated; the crude product was purified by chromatography on neutral alumina, thus yielding 6α,16α-dimethyl-17α-hydroxy-1-dehydro-progesterone.

*Example II*

A mixture of 2 g. of 6β,16α-dimethyl-pregnane-

3β,5α,17α-triol-20-one 5-acetate, prepared in accordance with Example I, 50 cc. of acetic acid and 1 cc. of concentrated hydrochloric acid was kept at room temperature for 30 minutes and then diluted with ice water; the precipitate was collected, washed with water, dried and recrystallized from acetone-hexane, thus giving 6β,16α-dimethyl-17α-hydroxy-progesterone.

A portion of the above compound was dehydrogenated by the reaction with selenium dioxide, as described in Example I, to form 6β,16α-dimethyl-17α-hydroxy-1-dehydro-progesterone, whose stearic configuration at C–6 was then inverted by the treatment with dry hydrogen chloride in accordance with the method described in Example I. Another portion of 6β,16α-dimethyl-17α-hydroxyprogesterone was subjected to the same acid treatment in order to invert the stearic configuration at C–6.

*Example III*

A mixture of 5 g. of 6α,16α-dimethyl-17α-hydroxyprogesterone intermediate in Example I, 10 g. of chloranil, 75 cc. of ethyl acetate and 25 cc. of acetic acid was refluxed under an atmosphere of nitrogen for 96 hours. The mixture was washed with 5% aqueous sodium hydroxide solution until the washings were colorless, then with water, dried over anhydrous sodium sulfate and the ethyl acetate was evaporated. By chromatography of the residue on neutral alumina there was obtained 6,16α-dimethyl-6-dehydro-17α-hydroxyprogesterone.

A solution of 3 g. of the above compound in 150 cc. of glacial acetic acid and 30 cc. of acetic anhydride was treated with 3 g. of p-toluenesulfonic acid and kept overnight at room temperature; it was then poured into water, heated for half an hour on the steam bath, cooled and the precipitate formed was collected by filtration, washed with water, dried and recrystallized from benzene. There was thus obtained 6,16α-dimethyl-17α-hydroxy-6-dehydro-progesterone acetate.

2 g. of the above compound was refluxed with selenium dioxide in t-butanol and in the presence of pyridine, following the reaction conditions and procedure of isolation described in Example I, thus yielding 6,16α-dimethyl-1,6-bis-dehydro-17α-hydroxyprogesterone acetate.

A mixture of 1 g. of the above compound and 50 cc. of 1% methanolic potassium hydroxide was stirred overnight at a temperature around 35° C. and under an atmosphere of nitrogen. It was then acidified with acetic acid, concentrated to a small volume under reduced pressure, diluted with water and the precipitate was collected, washed with water, dried and recrystallized from acetone-hexane, thus furnishing the free 6,16α-dimethyl-1,6-bis-dehydro-17α-hydroxyprogesterone.

A mixture of 500 mg. of the above compound, 2 g. of caproic anhydride, 30 cc. of benzene and 300 mg. of p-toluenesulfonic acid was kept at room temperature for 3 days and then diluted with water, heated for 1 hour on the steam bath under stirring and cooled. The benzene layer was separated, washed with 5% aqueous sodium bicarbonate solution and then with water, dried over anhydrous sodium sulfate and the benzene was evaporated. By chromatography of the residue on neutral alumina and recrystallization of the solid fractions from acetone-hexane. There was obtained 6,16α-dimethyl-1,6-bis-dehydro-17α-hydroxyprogesterone caproate.

*Example IV*

A mixture of 1 g. of 6α,16α-dimethyl-17α-hydroxyprogesterone (intermediate in Example I), 2 g. of chloranil and 20 cc. of n-amyl alcohol was refluxed for 18 hours under an atmosphere of nitrogen, cooled, diluted with water and extracted several times with methylene chloride; the extract was washed with water, dried over anhydrous sodium sulfate and the solvent was evaporated; crystallization of the residue from acetone-hexane furnished 6,16α-dimethyl-1,6-bis-dehydro-17α-hydroxyprogesterone, identical with the one obtained in accordance with the method of Example III.

We claim:
1. 6,16α-dimethyl-$\Delta^{1,4,6}$-pregnatriene-17α-ol-3,20-dione.
2. 6,16α-dimethyl-17α-acyloxy-$\Delta^{1,4,6}$-pregnatriene-3,20-dione wherein the acyloxy group is that of a hydrocarbon carboxylic acid of less than 12 carbon atoms.
3. The 17-acetate of 6,16α-dimethyl-$\Delta^{1,4,6}$-pregnatriene-17α-ol-3,20-dione.
4. The 17-caproate of 6,16α-dimethyl-$\Delta^{1,4,6}$-pregnatriene-17α-ol-3,20-dione.

References Cited in the file of this patent
UNITED STATES PATENTS 2,878,247    Miramontes et al.    Mar. 17, 1959
2,891,079    Dodson et al.    June 16, 1959

OTHER REFERENCES

Ringold et al.: 81 J.A.C.S. 3485 (1959).
Fieser and Fieser: "Steroids" (1959) page 565.